April 12, 1932.    C. F. LAMBERT    1,853,309
APPARATUS FOR STARTING AND MAINTAINING VAPORIZATION OF LIQUID FUEL
Filed Dec. 5, 1927    3 Sheets-Sheet 1

INVENTOR.
CHARLES F. LAMBERT
BY
ATTORNEY.

April 12, 1932. C. F. LAMBERT 1,853,309
APPARATUS FOR STARTING AND MAINTAINING VAPORIZATION OF LIQUID FUEL
Filed Dec. 5, 1927 3 Sheets-Sheet 2

INVENTOR.
CHARLES F. LAMBERT
ATTORNEY.

April 12, 1932.  C. F. LAMBERT  1,853,309

APPARATUS FOR STARTING AND MAINTAINING VAPORIZATION OF LIQUID FUEL

Filed Dec. 5, 1927    3 Sheets-Sheet 3

INVENTOR.
CHARLES F. LAMBERT
BY
ATTORNEY.

Patented Apr. 12, 1932

1,853,309

UNITED STATES PATENT OFFICE

CHARLES F. LAMBERT, OF GROSSE POINTE, MICHIGAN, ASSIGNOR, BY MESNE ASSIGNMENTS, TO CLAYTON & LAMBERT MANUFACTURING CO., OF DETROIT, MICHIGAN, A CORPORATION OF DELAWARE

APPARATUS FOR STARTING AND MAINTAINING VAPORIZATION OF LIQUID FUEL

Application filed December 5, 1927. Serial No. 237,701.

This invention relates to method and apparatus for starting and maintaining vaporization of liquid fuel. It has to do particularly with novel and extremely compact and simple burner structure for fire pots and similar articles for accelerating the starting and maintaining the vaporization of the liquid fuel after starting.

Heretofore in the design of liquid fuel burners and starting apparatus therefor, it has been the general practice to provide a generator tube of varying design and a drip pan for receiving suitable fuel for heating the generator tube by means of an open flame. Various devices have been designed for directing the starting fuel into the priming cup and for keeping liquid fuel burners going after they have once been started. But all of these devices, unless they have utilized separate generator members or completely separate, complicated starting devices, have required an unusually long time in starting up the vaporization of the liquid fuel. This has been particularly true in fire pots and similar structures utilizing liquid fuel because of the compactness of the structure and the fact that the parts should be stationary as much as possible. Another difficulty attending the burner structure of fire pots has been the impossibility of controlling and graduating the flame from practically a pilot flame to an intense blast.

It is the object of the present invention to provide a fire pot of novel design, and having in combination therewith starting and generating apparatus of extremely simple and compact structure, said starting apparatus being positive in operation and greatly accelerating the time required for starting the burner. More specifically, this invention contemplates the provision of generating and starting apparatus for fire pots, all the parts of which are stationary with the exception of an extremely simple and compact part whose function is to act as a blast deflector for initially deflecting the generated gas issuing from the main generator back against itself to accelerate the starting thereof. The mixing chamber is positioned a fixed distance from the outlet of the generator and is so arranged in combination with the manifold and the priming cup that the fuel for initially filling the priming cup is directed thereto regardless of whether or not the single movable part, namely the blast deflector, is in starting position. As a result of this structure, an extremely compact device is obtained, the priming cup is formed stationary with the generator and mixing chamber, and the movable blast deflector is a very small inexpensive part positioned between the generator and inlet of the mixing chamber, the entire apparatus cooperating to insure positive quick starting of the burner structure at all times.

Other features of the present invention have to do with the arrangement of the various parts going to form the fire pot including the structure for maintaining the vaporization of the liquid fuel in the generator, as will be brought out in the specification and claims appended hereto.

Figure 1:
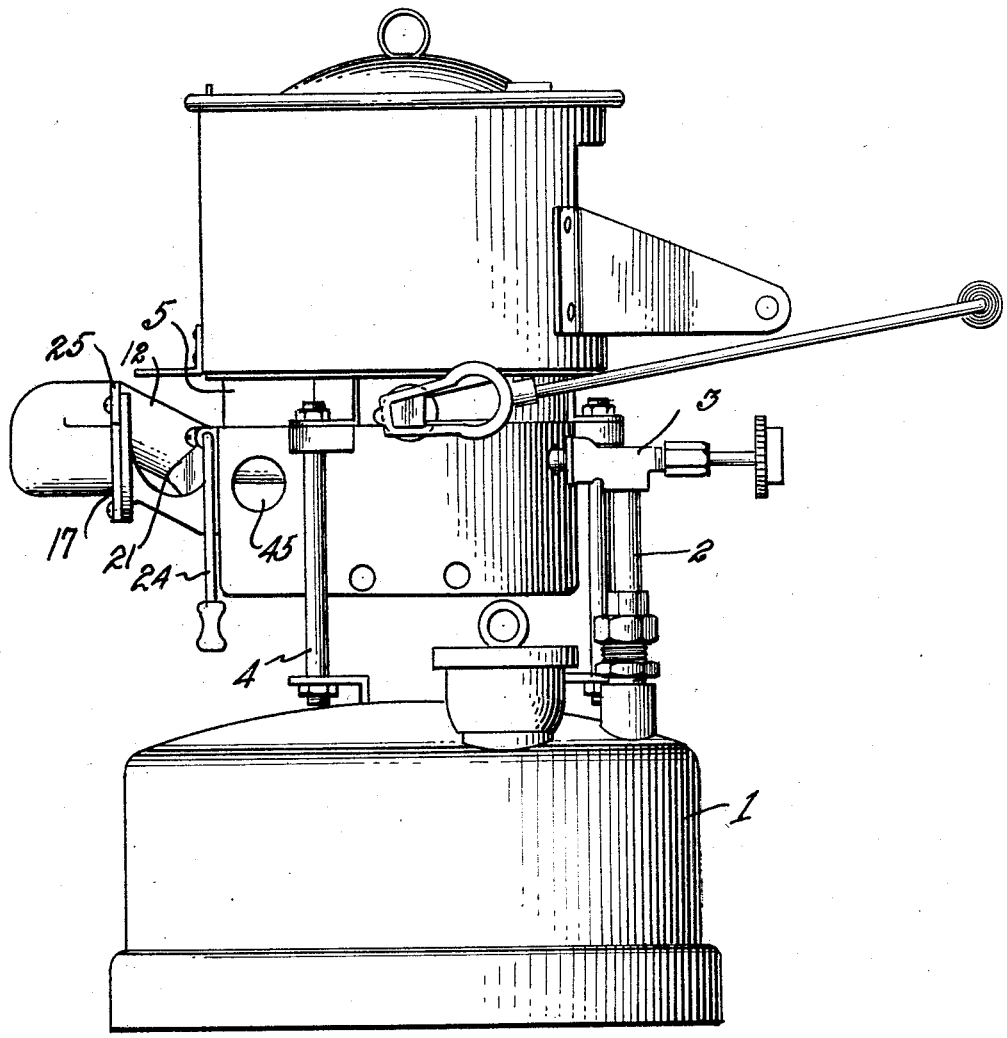
Fig. 1 is a front elevation of a fire pot embodying the features of my invention and showing in particular the blast deflector in its downward starting position.

In illustrating the present invention, it has been shown in connection with a fire pot of standard design with the general arrangement similar to that disclosed in my copending application #223,170, filed September 30, 1927, but it will be obvious that the novel generating and starting apparatus here disclosed may be utilized in connection with any similar liquid fuel burner structure involving the same problems of starting and compactness of design.

The fire pot may be provided with a suitable supply tank or fuel reservoir 1 from which leads a suitable pump (not shown) and a suitable conduit 2 for conducting the fuel under pressure from the supply tank 1 to the inlet valve structure 3 of the generator. The main burner structure of the fire pot, and in fact all of the apparatus is suitably supported by means of the bolts 4.

Figure 6:
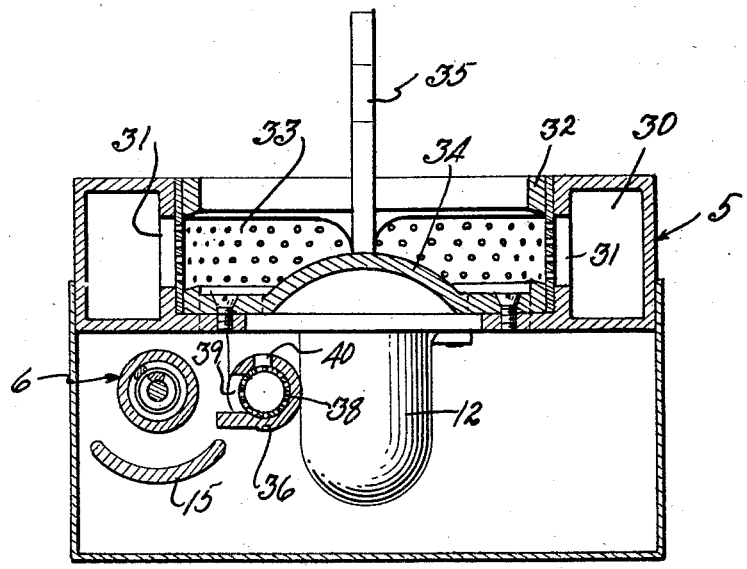
Fig. 6 is a section taken on line 6—6 of Fig. 5 and also illustrating the relative positions of the generator tube, the priming cup and main and auxiliary burners.

The main burner structure, which is annular in formation, may be designated 5 and this burner structure is provided with suitable lugs connected to the bolts 4 whereby to provide a rigid, compact and easily assembled structure. Positioned slightly below the annular burner structure and extending to one side thereof is a suitable generator tube which may be generally designated 6, as best shown in Fig. 6. This generator tube projects forward from the valve member 3, where the flow of fuel into the generator is controlled and is provided with a suitable stem 7 which projects forwardly from the valve and acts as a cleaner tip for a jet block 8. The end of the capillary tube is enlarged for a purpose that will be later described, and suitable wires 9 in the smaller part of the tube end 10 in the larger part of the tube are in coiled helical form so as to positively transmit the liquid fuel by capillary action out through the generator tube.

A combined manifold 12 and mixing chamber 13 is preferably carried by the main burner structure, and the inlet end 14 of the mixing chamber part of this conduit preferably terminates at a fixed spaced position from the outlet orifice of the jet block. The fuel conducting manifold 12 preferably extends upwardly from the mixing chamber, as best shown in Figs. 2 and 3, whereby it will be impossible for any liquid fuel issuing from the jet block to be conducted through the manifold and into the burner.

Figure 2:
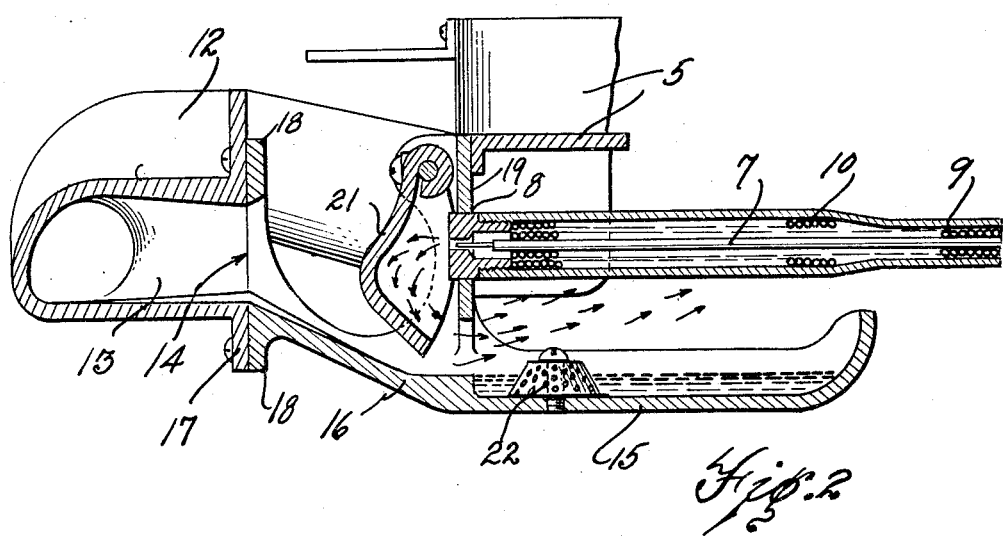
Fig. 2 is an enlarged fragmentary sectional view of the generating and starting structure and showing the movable blast deflector in its downward position for deflecting the issuing vapor from the generator tube back against itself to form a blast of flame.
Figure 3:
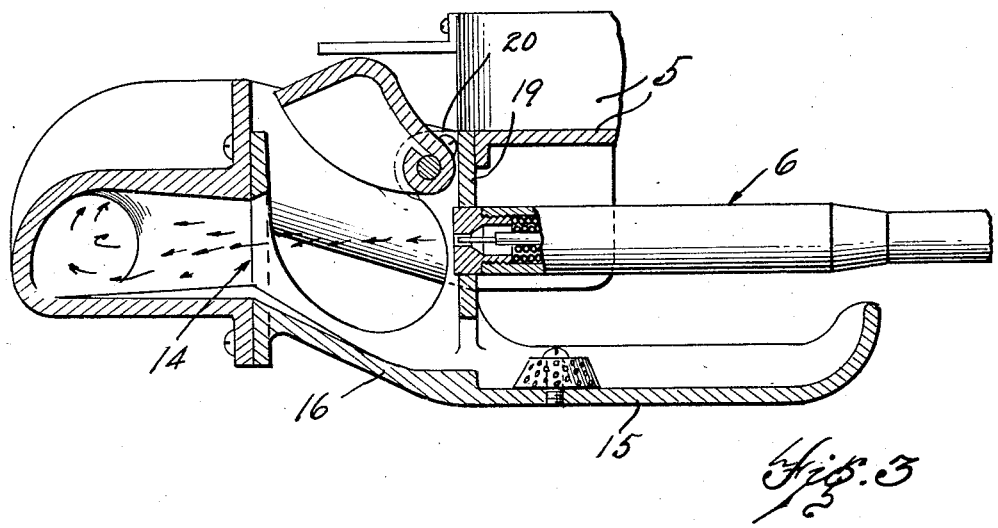
Fig. 3 is a view similar to Fig. 2 but illustrating the deflector member in its upward position and allowing the vaporized fuel from the generator to pass directly through to the mixing chamber and upwardly and around through the manifold conduit.
Figure 4:
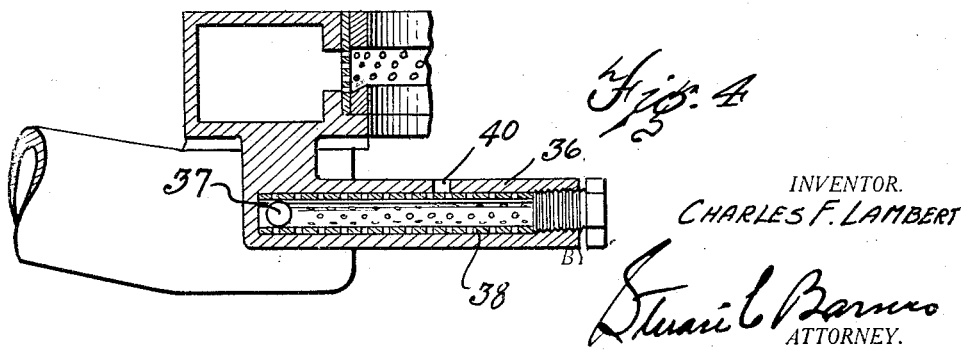
Fig. 4 is a fragmentary enlarged sectional view taken through the main burner and the auxiliary burner for directing flames against the generator to maintain vaporization.

A priming cup 15 is preferably positioned underneath the enlarged portion of the generator tube, as best shown in Figs. 2 and 3 and is supported in such position by securing said priming cup and an extension 16 thereof to the flanged portion 17 of the manifold and mixing chamber. The portion 16 is positioned at an angle and so terminates in registry with the mixing chamber 13 that any liquid fuel in said mixing chamber will flow down the trough formed by the member 16 and into the priming cup 15. The upper end of the extension 16 preferably terminates in an annular flange 18 which serves as reinforcing means and for securing the priming cup to the flange 17. It will be understood, however, that the flange 18 is only for reinforcing and connecting purposes and does not in any manner restrict or predetermine the flow of air into the mixing chamber 13, as the generating apparatus is designed to permit a perfectly free flow of air from the atmosphere into the mixing chamber due to the space between the jet block and the inlet 14 of the mixing chamber.

Figure 5:
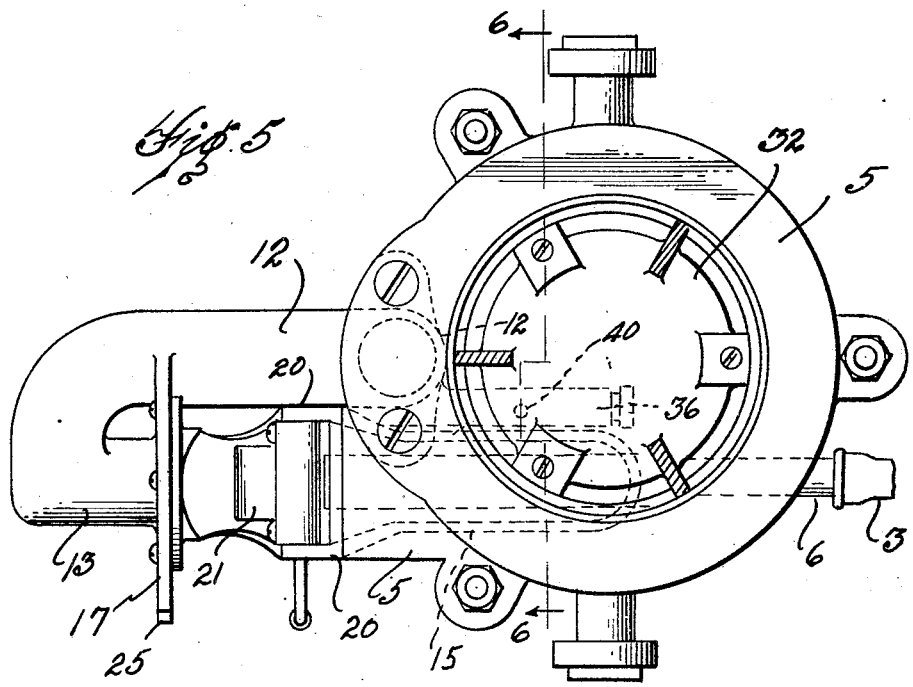
Fig. 5 is a plan view of the fire pot and its associated burner structure, illustrating in general the positioning of the deflector between the generator and inlet of the mixing conduit, and also showing the manner of conducting the vaporized fuel to the main burner, and the auxiliary burner positioned alongside the generator tube.

The stationary priming cup 15 and its extension 16 are preferably formed to also include as an integral part thereof a head or plate 19, which head is provided with an aperture for receiving and positioning the jet block of the generator tube, and which is also provided with suitable ears 20, as best shown in Fig. 5 for pivotally supporting a deflector member 21. The deflector member 21 is so formed that when positioned downwardly, as shown in Fig. 2, any fuel vapors issuing from the jet block 8 will strike the curved surface of the deflector and be deflected downwardly and backwardly against the generator itself, the absorbing member or wire mesh 22 being so positioned as to assist in deflecting the rearwardly directed fuel vapors and flames upwardly against the generator tube.

The shaft to which the deflector 21 is secured is provided with a suitable handle 24, as shown in Figs. 1 and 5, and the flange 17 is provided with a suitable lip 25 for frictionally receiving and positioning the slightly resilient handle 24 when moved upwardly. When the handle is in its upward position and engaged by the lip 25 the deflector will be positioned upwardly, as shown in Fig. 3.

As before described, the manifold 12 is secured to the underneath side of the annular burner member 5, as best shown in Figs. 5 and 6, and the outlet of the manifold leads into an annular chamber 30 formed in the burner casting. The inner surface of this annular member 5 is slotted, as at 31, and an annular member 32 is adapted to be inserted within the center of said annular member 5 to hold a perforate screen 33 in position, as best shown in Fig. 6. The perforations in the screen 33 form outlets for the combustible vapors and thus form a burner structure. The member 32 is insertable as a unit within the annular burner 5 and comprises a convex deflecting member 34 and a plurality of stepped supporting and reinforcing members 35. It will thus be seen that this novel burner member constitutes a combined top and burner member, and due to the combination of various parts, the flames are directed inwardly and deflected upwardly, producing a very efficient flame but having no detrimental effect on the combined burner and top structure. This combined burner and top structure forms the subject matter of a divisional application.

Leading from the manifold 12 and extending parallel and closely adjacent to the generator member 6 is an auxiliary burner member 36. This auxiliary burner member, which is best illustrated by Figs. 3 and 6, is tubular in form, is preferably cast integrally with the manifold member 12 and is connected to such manifold by means of a passageway 37 whereby a predetermined amount of vaporized fuel is conducted into the auxiliary burner during the operation of the main burner. This auxiliary burner is open at its outer end and is adapted to receive a tubular perforate screen member 38 which extends the length of the interior of the auxiliary burner. The side of the auxiliary burner 36, adjacent the generator member 6, is slotted as at 39, and the top of the auxiliary burner is provided with a pilot burner port 40, said port being positioned adjacent the annular main burner 5 whereby a pilot flame therefrom will serve to ignite the main burner. It will thus be seen that this perforate screen member 38 acts as a burner screen, and being recessed or positioned a certain distance inwardly from the periphery of the auxiliary burner member, aids in producing an enclosed burner opening which makes it very difficult to blow the flame out. The purpose of this is to make the auxiliary burner positive in its operation when the fire pot is turned down very low.

In operation, the fuel in the tank 1 having been placed under pressure, the deflector member 21 is preferably lowered into the space between the jet block and the mixing chamber, as best shown in Fig. 2. The valve 3 is then opened and the liquid fuel will fill the generator tube 6 and issue from the jet block in the form of a fine stream. This fine stream will be deflected into the priming cup, and when the priming cup is partially filled the valve 3 may be closed.

It will also be understood that, if desired, the deflector member 21 may remain in its upward position and the fine stream of fuel entering the mixing chamber 13 will flow backwardly and downwardly to fill the priming cup 15.

Having partially filled the priming cup, the liquid fuel therein may be ignited through the lighter opening 45 formed in the shield member, shown in Fig. 1, and the open flames rising from the priming cup will immediately heat the enlarged portion of the generator tube, and due to the relatively large surface thereof presented by this enlarged portion and the two rows of helical coiled wire therein, producing a very thin film of liquid fuel; such liquid fuel will be immediately vaporized and will issue in the form of vapor through the jet block. This issuing stream of vapor will strike the curved deflector member 21 and be deflected downwardly and backwardly over the surface of the fuel in the priming cup and up against the generator member 6 in the form of a strong positive blast of flame. This will greatly increase acceleration of the starting or heating of the generator tube 6, and when the liquid fuel has been exhausted or partially exhausted from the priming cup, due to both the open flame and the blast formed by the deflector, the generator tube will have been sufficiently heated for normal continued operation in the fire pot, the blast deflector 21 having so increased the consumption and burning of the liquid fuel as to reduce the time of starting from eight to ten minutes to approximately a minute and a half.

The skilled operator operating this fire pot may only introduce a very small amount of fuel into the priming cup, and after it has started to burn and heat the generator tube, slightly open the valve member 3 to introduce a very small amount of liquid fuel through the generator tube. This will increase the velocity of the vapor issuing from the generator tube and incidentally increase the intensity of the blast deflected rearwardly against the generator tube. This operation accelerates the starting and heating of the generator tube even to a greater extent so that the operator can, in a very short time, raise the deflecting member and allow the stream of vaporized fuel to be projected into the mixing chamber where it will be properly mixed and will be conducted through the manifold to the auxiliary and main burner.

The deflector member 21 may be raised even before all of the liquid fuel has been exhausted from the priming cup, and it will be obvious that in this case that if the vaporized fuel is conducted around the manifold and introduced into the auxiliary mixing chamber that the flames from the still untrapped fuel in the priming cup will ignite the vapor issuing from the perforate screen 38. The flame therefrom will be projected against the generator to heat the same, and such flame will also ignite the small amount of vapor issuing from the pilot flame 40, whereby when sufficient combustible vapor is projected from the main burner it will be automatically lighted from the flame of the pilot burner.

The preferred operation in a fire pot of this type is to only allow a small amount of fuel enter the drip pan and to increase the accelerating of the starting after the lowering of the deflector by slightly opening the inlet valve 3. However, it will be understood that the apparatus may be effectively started without even utilizing the deflector 21, as the fuel may drain back from the mixing chamber 13 into the drip pan and then ignited to heat the generator by means of an open flame. After the valve 3 is turned off to shut down the fire pot all the fuel and fuel vapor in the generator will be drained out by virtue of the capillary action set up by the presence of the coiled wires 9 and 10 so as to efficiently prevent carbonization.

It will thus be seen that I have provided a fire pot having very simple and compact starter and burner structure of relatively few but strong parts, the various component parts being stationary and arranged to effect positive and quick starting and a continued burning which may be very accurately graduated at will. The starter parts of this novel structure include only one member which is movable and the various parts are visible and so arranged as to effect positive filling and starting of the starting apparatus regardless of this single movable part. It will further be obvious that I have provided a burner structure for fire pots whereby the head of the generator member and the mixing chamber are in spaced relation, and the priming cup is connected to the spaced mixing chamber to positively drain all liquid fuel in the priming cup. This arrangement makes possible the use of a blast deflector positioned in the open space between the generator head and the inlet of the mixing chamber whereby to accelerate starting by deflecting the vapor from the main generator back against itself.

Claims:

1. Liquid fuel burners of the type described, comprising in combination a main burner member, a generator member positioned adjacent the main burner head, a combined manifold conduit and mixing chamber extending laterally from the burner and terminating in spaced relation to the end of the generator member, an auxiliary burner connected to said manifold and positioned alongside said generator for heating same and a blast deflector pivotally mounted in the space between the end of the generator member and the inlet of the combined mixing and manifold conduit and movable to a position in front of the generator member for accelerating the starting thereof.

2. Liquid fuel burners of the type described, comprising in combination a main burner member, a generator member positioned below and adjacent the main burner head, a manifold conduit extending laterally from the burner structure and terminating in spaced relation to the end of the generator member, a blast deflector pivotally mounted in the space between the ends of the generator member and the inlet of the manifold conduit, and an auxiliary burner leading off from said manifold in a position alongside the said generator member, a perforate screen positioned on the inside of said auxiliary burner, and a slot on the side of said auxiliary burner adjacent said generator member whereby said perforate screen forms a burner screen for deflecting flames against the generator.

3. Liquid fuel burners of the type described, comprising in combination a main burner member, a generator member positioned below and adjacent the main burner head, a manifold conduit and mixing chamber extending laterally from the burner structure and terminating in spaced relation to the end of the generator member, and a blast deflector pivotally mounted in the space between the ends of the generator member and the inlet of the combined mixing and manifold conduit, an auxiliary burner leading off from said manifold in a position alongside the said generator member, a perforate screen positioned on the inside of said auxiliary burner, a slot on the side of said auxiliary burner adjacent said generator member for projecting flames against the generator, and an aperture in the upper part of said auxiliary burner, said aperture being positioned adjacent said main burner, and designed to present a pilot flame for maintaining either or both of said burners in lighted condition during normal operation.

4. A generating and starting device for liquid fuel burners of the type described, comprising a generating tube, a mixing chamber positioned in alignment with but spaced from the end of said tube, a manifold conduit having a portion connected to and extending upwardly from said mixing chamber, a stationary priming cup positioned beneath the generator tube, and a blast deflector movable in the space between the generator tube and the inlet and mixing conduit, the blast deflector being adjustable and so shaped to in one position openly and directly deflect the fuel vapor issuing from the generator backwardly over the fuel in the priming cup and against itself to accelerate starting, and in another position to allow the fuel vapor from the same generator tube to be projected toward and into said mixing chamber.

5. A generating and starting device for liquid fuel burners of the type described, comprising a stationary burner member, a stationary generator tube, a manifold conduit extending from said burner and terminating at a point spaced in front of the end of said generator tube, an auxiliary burner extending from said manifold alongside said generator tube for normally heating same, a priming pan carried by the end of said mixing chamber and extending beneath the generator tube, and a blast deflector pivotally mounted in the space between said generating tube and inlet of said mixing chamber, said blast deflector being movable into one position in front of the generator tube to direct an open blast of fuel vapor rearwardly and upwardly against the generator tube for accelerating the starting of the same, and movable to another position to allow the inlet of fuel vapor and air into the mixing chamber.

6. Liquid fuel burner structure of the type described comprising an annular burner member, a generator tube positioned underneath thereof and terminating in a jet block positioned adjacent the periphery of the burner, a combined manifold and mixing chamber carried by the burner, terminating in a spaced position from the jet block, and a priming cup carried by said combined manifold and mixing chamber and extending downwardly to a position beneath the generator tube.

7. Liquid fuel burner structure of the type described comprising an annular burner member, a generator tube positioned underneath thereof and terminating in a jet block positioned adjacent the periphery of the burner, a manifold carried by the burner, terminating in a spaced position from the jet block, a priming cup member carried by said manifold and extending downwardly to a position beneath the generator tube, and a blast deflector pivotally carried by said stationary priming cup member whereby to be moved in starting position in front of said jet block or upwardly out of the way to permit entrance of the fuel vapor into the mixing chamber.

8. A starting device for fire pots and similar liquid fuel burners, comprising in combination a main stationary generator tube, a stationary priming cup positioned beneath the generator, and a blast deflector adjustably mounted in front of said generator tube and movable to one position to deflect fuel vapor initially issuing from said generator tube backwardly in an open blast of flame over the surface of the fuel in the priming cup and against itself to accelerate starting.

9. A starting device for fire pots and similar liquid fuel burners, comprising in combination with a generator tube and a manifold conduit spaced horizontally therefrom and extending upwardly from its inlet end, a stationary priming cup having a portion connecting with said manifold to drain any liquid fuel in said manifold into the priming cup, a blast deflector, and means for effecting relative movement between the blast deflector and the end of the generator tube whereby the blast deflector will deflect fuel vapors initially issuing therefrom backwardly as an open blast of flame against the generator to accelerate starting thereof.

10. A generating device for fire pots and similar liquid fuel burners, comprising in combination a stationary burner member, a stationary generator tube positioned below said burner member, a combined manifold conduit and mixing chamber extending from the main burner member and terminating in spaced relation to the end of the generator tube, blast deflector means positionable in front of said generators for initially deflecting the fuel vapor issuing therefrom to accelerate starting, an auxiliary burner deriving its fuel vapor from said manifold and positioned closely adjacent said generator tube, the interior of said auxiliary burner being provided with a perforate screen, and the exterior of said burner being slotted on its surface adjacent the generator tube.

11. A generating device for fire pots and similar liquid fuel burners, comprising in combination a stationary burner member, a generator tube positioned below said burner member, a combined manifold conduit and mixing chamber extending from the main burner member and terminating in spaced relation to the end of the generator tube, blast deflector means positionable in front of said generators for initially deflecting the fuel vapor issuing therefrom to accelerate starting, an auxiliary burner deriving its fuel vapor from said manifold and positioned closely adjacent said generator tube, the interior of said auxiliary burner being provided with a perforate screen, the exterior of said burner being slotted on its surface adjacent the generator tube, and the top of said auxiliary burner being provided with an aperture backed by the perforate screen member for presenting a pilot flame intermediate the slotted portion of the auxiliary burner and main burner.

In testimony whereof I affix my signature.

CHARLES F. LAMBERT.